(12) United States Patent
Sloan et al.

(10) Patent No.: US 8,704,831 B2
(45) Date of Patent: Apr. 22, 2014

(54) IRRADIANCE RIGS

(75) Inventors: Peter-Pike Sloan, Cottonwood Heights, UT (US); Hong Yuan, Amherst, MA (US)

(73) Assignee: Disney Enterprises, Inc., Burbank, CA (US)

( * ) Notice: Subject to any disclaimer, the term of this patent is extended or adjusted under 35 U.S.C. 154(b) by 590 days.

(21) Appl. No.: 12/756,688

(22) Filed: Apr. 8, 2010

(65) Prior Publication Data

US 2011/0248998 A1    Oct. 13, 2011

(51) Int. Cl.
*G06T 15/50* (2011.01)

(52) U.S. Cl.
USPC .......................................................... 345/426

(58) Field of Classification Search
None
See application file for complete search history.

(56) References Cited

U.S. PATENT DOCUMENTS

| | | | |
|---|---|---|---|
| 7,310,101 B2 * | 12/2007 | Wang et al. | 345/582 |
| 8,207,968 B1 * | 6/2012 | Krishnaswamy et al. | 345/426 |
| 2010/0085360 A1 * | 4/2010 | Ren et al. | 345/426 |

OTHER PUBLICATIONS

Tom Forsyth—Spherical Harmonics in Actual Games, Muckyfoot Productions Ltd; Game Developers Conference Europe, 2003.*
Natalya Tatarchuk, Irradiance Volumes for Games, 3D Application Research Group—ATI Research, Inc., Game Developers Conference Europe, 2005.*
Stamate, Vlad. "Reduction of Lighting Calculations Using Spherical Harmonics." Shaderx 3: Advanced Rendering With DirectX and OpenGL (2005): pp. 251-253, 256-260.*

* cited by examiner

*Primary Examiner* — Daniel Hajnik
(74) *Attorney, Agent, or Firm* — Patterson & Sheridan LLP (57) ABSTRACT

Techniques are disclosed for using a local lighting representation to explicitly model spatial variation of a character in a graphics scene as well as for using error driven criteria to determine whether to evaluate a given light source analytically or in a lighting rig. For near light sources, the error driven criteria may be used to determine when a spherical light source should be evaluated in the lighting rig verses analytically. For large characters, local irradiance models may be used to provide a limited form of spatial variation.

24 Claims, 10 Drawing Sheets

IRRADIANCE RIGS

BACKGROUND

1. Field of the Invention

The present invention relates to the field of computer graphics and, in particular, to techniques for lighting characters in a computer-generated graphics scene.

2. Description of the Related Art

It is common for video games to pre-compute the static or diffuse lighting for three-dimensional (3D) scene geometry. The pre-computed lighting data is then used to light elements of the scene geometry at runtime (i.e., when the video game is played). This approach separates the lighting used for static elements of the scene from the lighting of dynamic elements, such as characters.

Generating realistic character lighting in video games using precomputed lighting is a challenging problem. As the use of static precomputed lighting in games has become more common, it has become important to ensure that the characters are lit in a way that visually places them in the lighting environment of the scene. Precomputed lighting in a 3D scene is frequently based on hundreds of light sources placed by a lighting artist. However, evaluating large numbers of light sources analytically to light a character at runtime is impractical on current console hardware, so the lights are typically projected into a spherical harmonic (SH) basis centered at the character every frame, decoupling lighting complexity when rendering a character. For example, one technique for lighting characters in a scene with precomputed lighting is to generate lighting textures using a virtual point light model (placed by a lighting artist) and using these sources to light the character at runtime, e.g., using an instant radiosity technique.

However, this approach to lighting a character does not produce realistic images in a certain common situations. For example, light sources near a character, (e.g., a flare) look wrong. The higher the intensity of the near light source, the less realistic the appearance of the character lighting that results, as the lighting does not change over the surface of the character. Similarly, lighting large objects (e.g., a dinosaur) can have significant lighting variation over the object, even for mid-distant lighting. The worst-case scenario is when both problems are present, e.g., a flare near the tail of a dinosaur.

SUMMARY

Embodiments of the invention provide a technique for lighting 3D scene geometry using irradiance rigs for light sources distant from a character—and analytically evaluating light near the character. One embodiment includes a computer-implemented method for computing lighting irradiance for an object in a three-dimensional (3D) graphics scene having one or more light sources. The method may generally include for a plurality of frames depicting the object in the 3D graphics scene being lit by the light sources, classifying, based on an error metric, one or more of the light sources as being evaluated analytically or approximated using an irradiance rig associated with the object. The error metric characterizes an error resulting from evaluating a respective one of the light sources using the irradiance rig associated with the object. Further, the respective light sources are classified to be evaluated using the irradiance rig when the error is below a specified threshold.

In a particular embodiment, the error metric for the one or more light sources is an error curve modeling how much error results from lighting the object using the irradiance rig associated with the object based on a lighting intensity of the light source and a distance between the object and the light source in the 3D graphics scene. The irradiance rig may be any combination of a constant rig, a gradient rig, and a lattice rig.

Another embodiment of the invention includes a computer-readable storage medium storing instructions that, when executed by a processor, cause a computer system to perform an operation for computing lighting irradiance for an object in a three-dimensional (3D) graphics scene having one or more light sources. The operation may generally include, for a plurality of frames depicting the object in the 3D graphics scene being lit by the light sources, classifying, based on an error metric, one or more of the light sources as being evaluated analytically or approximated using an irradiance rig associated with the object. The error metric characterizes an error resulting from evaluating a respective one of the light sources using the irradiance rig associated with the object. Further, the respective light sources are classified to be evaluated using the irradiance rig when the error is below a specified threshold.

Still another embodiment includes a system having a processor and a memory configured to perform an operation for computing lighting irradiance for an object in a three-dimensional (3D) graphics scene having one or more light sources. The operation may generally include, for a plurality of frames depicting the object in the 3D graphics scene being lit by the light sources, classifying, based on an error metric, one or more of the light sources as being evaluated analytically or approximated using an irradiance rig associated with the object. The error metric characterizes an error resulting from evaluating a respective one of the light sources using the irradiance rig associated with the object. Further, the respective light sources are classified to be evaluated using the irradiance rig when the error is below a specified threshold.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide techniques for lighting dynamic elements, such as characters in computer generated images, e.g., for lighting characters in a video game from frame-to-frame. In particular, embodiments of the invention provide a technique that uses a local lighting representation to explicitly model spatial variation of a character and uses error driven criteria to determine whether to evaluate a given light source analytically or in a lighting rig. For near light sources, the error driven criteria may be used to determine when a spherical light source should be evaluated in the lighting rig verses analytically. For large characters, local irradiance models may be used to provide a limited form of spatial variation. For example, in addition to a constant lighting rig based on the center of a character, spherical harmonic gradients and regular lattices of spherical harmonic coefficients (or a mixed combination of both) may be used to provide a local irradiance model for the character. Further, the least squares technique can be used to efficiently compute the coefficients of the spatial model, based on the actual geometry of a character.

System Overview

Figure 1:
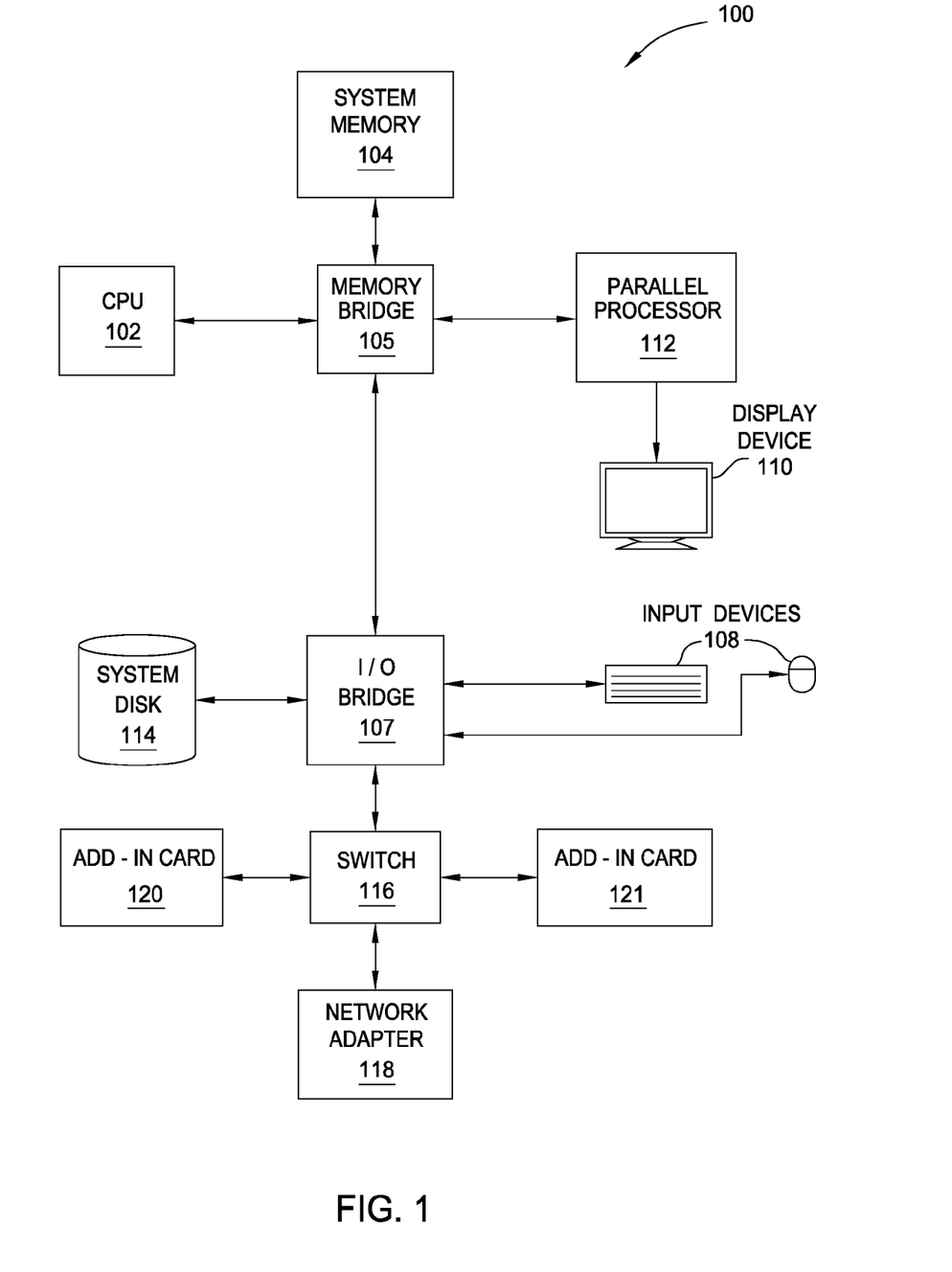
FIG. 1 is a block diagram of a system configured to implement one or more aspects of the present invention.

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Irradiance Rigs

Embodiments of the invention provide techniques for computing lighting levels for characters in an environment which uses precomputed lighting for 3D scene geometry. That is, for determining character lighting an environment where lighting for the scene is precomputed and the character is lit dynamically at runtime frame-by-frame. In one embodiment, a character may be associated with an irradiance rig—a lighting model used to approximate character lighting—based on the lighting in the scene. Examples of irradiance rigs include a constant rig, a gradient rig, a lattice rig, and a mixed rig.

Error driven criteria are used to determine which light sources to evaluate analytically versus being approximated inside the rig as the an object or character moves through the 3D scene geometry. Doing so enables efficient character rendering in a lighting environment with large numbers of light sources, while also maintaining accuracy for near light sources. In particular, light sources near the character may be evaluated analytically and more distant light sources may be evaluated using the irradiance rig associated with the character. The determination may be based on the distance between the character and the light source, as well as on the size of the character and intensity of the light source. In one embodiment, an error metric is used to determine when the approximation obtained by lighting the character in the rig falls below an acceptable level—leading to the evaluation of certain light sources analytically. For example, an error curve may be computed to model how much error results from lighting a character in an irradiance rig associated with a character. Further, a transition region may be used to gradually move from evaluating a light source analytically versus using the rig. Doing so may help avoid a visual "pop" in the appearance of a character that could occur by evaluating a light source analytically in one frame and then in the rig for the next frame (or vice versa).

Figure 2:
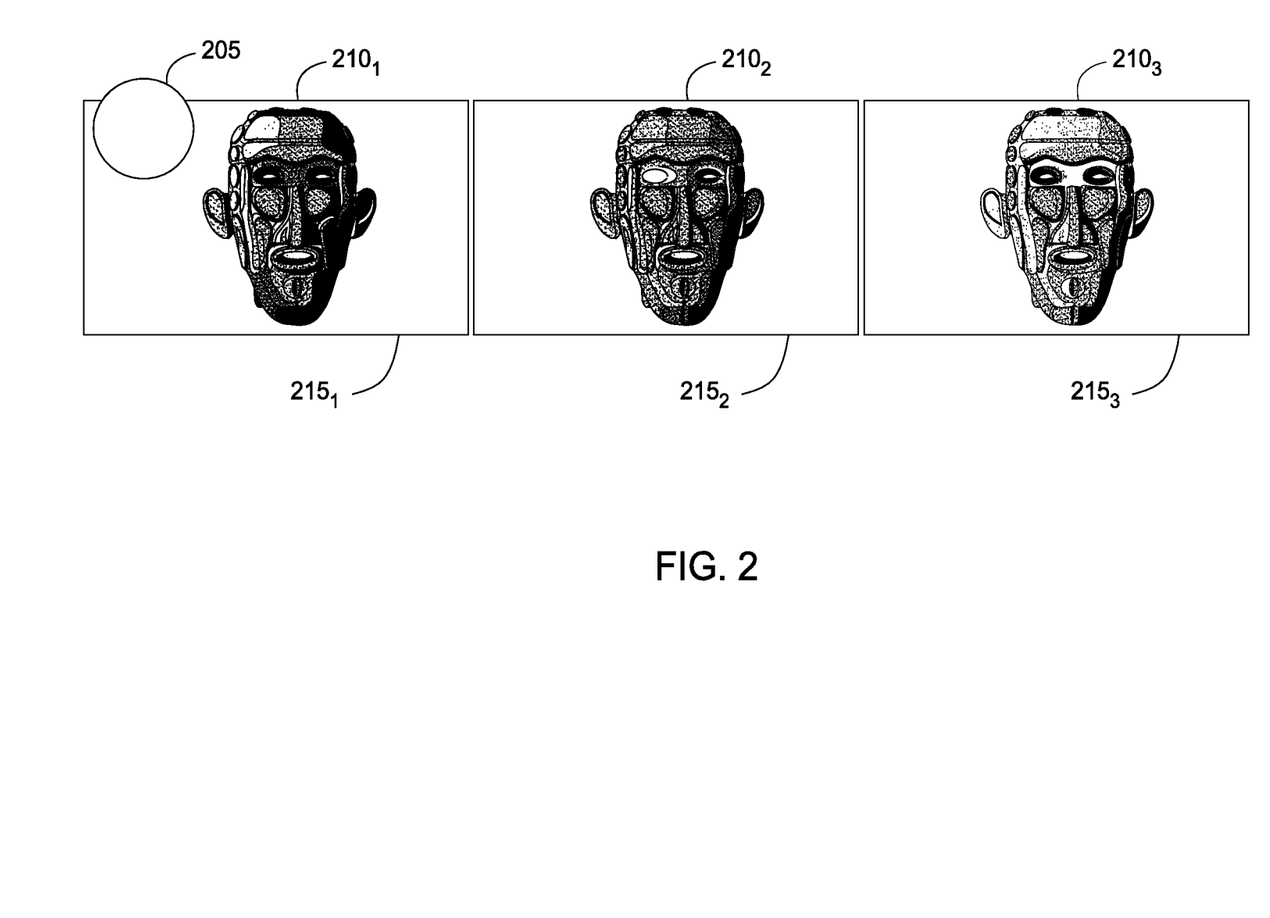
FIG. 2 shows an example of a character lit using an analytic approach.

FIG. 2 shows an example of a character 210 lit using an analytic approach, according to one embodiment of the invention. In this example, the character 210 is a head with contoured surfaces. To light character 210 analytically, each point on the surface of character 210 is evaluated to determine a lighting value based on the position and intensity of every light source visible to the character using techniques known in the art, e.g., by evaluating expensive analytic equations or tabulating the result in a texture and performing texture lookups.

As shown in panel $215_1$, the character $210_1$ is placed near a light source 205. As a result of the relative positions of light source 205 and character $210_1$, character $210_1$ exhibits a relatively large amount of light reflected off of the left temple. Also, character $210_1$ show a sharp gradient both vertically and horizontally, where portions of character $210_1$ further away from the top left quadrant exhibit much less irradiance than portions in the top left quadrant.

Panel $215_2$ shows the lighting that results from moving the light source further away from the character $210_2$. As shown the top left quadrant of panel 2152 and the left temple of the character $210_2$ still show some light being irradiated from the left temple, and character $210_2$ also shows a gradient where the irradiated light falls off when moving away from the top left quadrant. However, the effect is much more subdued relative to the appearance of the character $210_1$ in panel $215_1$.

Panel $215_3$ shows the lighting of character $215_3$ using a distant light source. As shown, when a light source becomes sufficiently distant, a character lit by a light source shows very small differences in irradiance at any point on the character $210_3$. In fact, at an infinite distance, the irradiance would only be determined by the normal—so there would be no variation strictly from the position of the receiver. Thus, the surface of character $210_3$ is shown with a relatively uniform degree of irradiance at any point, save for the shadowing effect where portions of the left side of the character $210_3$ result in shadow in the right side.

Note, one of ordinary skill in the art will recognize that the analytic approach for lighting a character shown in FIG. 2 provides the most accurate lighting results, as each point on the surface of the character may be evaluated for each light source in the scene. However, in a scene with many light sources, this approach may simply be impractical for currently available hardware. Accordingly, embodiments of the invention provide for the an approach for character lighting which uses an irradiance rig to evaluate the character lighting for at least some light sources in a scene, particularly where the irradiance rig provides a good approximation of the results that would otherwise be obtained by evaluating the character analytically.

Figure 3:
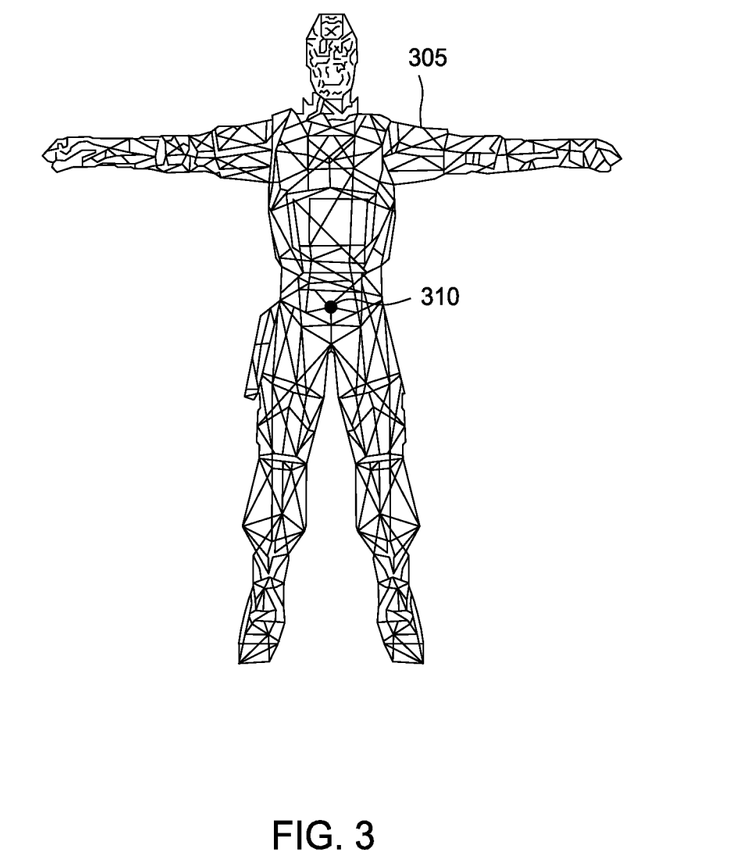
FIG. 3 is an example of a character lit using a constant irradiance rig, according to one embodiment of the invention.

FIG. 3 is an example of a character lit using a constant irradiance rig, according to one embodiment of the invention. Mathematically, an irradiance rig can be represented generically as follows:

$$l_i = M(p-c, m) = l_c$$

where, given a point (p) in a bounded volume around a character with center (c), the vector of irradiance coefficients ($l_i$) may be computed by evaluating a model function M(p, c) where (c) is a vector of coefficients for the given model that may be computed every frame as a function of the dynamic light sources and (p–c) represents a distance between the center of the character (a vector represented by point C) and the point (P), a vector representing the position on the surface of the character. The model parameters (m) represent parameters of the model used to evaluate the irradiance SH coefficients for any point p inside the volume. And the model parameters may be generated from all the dynamic light sources in the scene every frame.

The simplest lighting rig for a character is a constant spherical harmonic (SH) function. Known techniques may be used for projecting point or spherical light sources into this basis and only the quadratic band needs to be represented for diffuse materials. In the constant irradiance rig, the model parameters (m) are simply the SH projection of the light sources at the center of the $l_c$ (e.g., the center 310 of character 305). In such a case the lighting model is: $l_i$=M(p, $l_c$)=$l_c$. Thus, the irradiance coefficients ($l_i$) used to light any point on the surface of character 305 are simply the SH coefficients at center 310 of character 305.

As will be apparent to one of ordinary skill in the art, a constant irradiance rig results in no variation in the surface lighting of a character based on spatial variation, and instead results in a constant irradiance for the entire character. At the same time, the constant irradiance rig is much simpler to compute than analytically lighting a character and, for distant light sources, provides a good approximation of irradiance.

Figure 4:
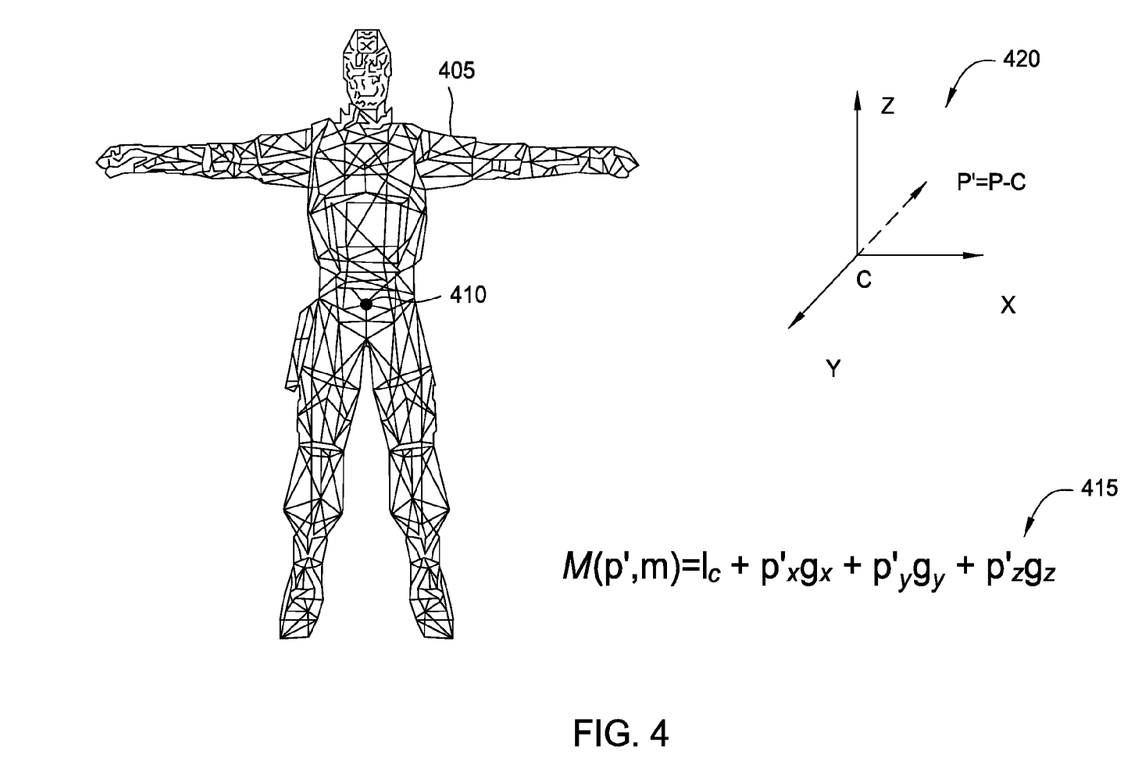
FIG. 4 is an example of a character lit using a gradient irradiance rig, according to one embodiment of the invention.

FIG. 4 is an example of a character lit using a gradient irradiance rig 420, according to one embodiment of the invention. The gradients provide a gradient of the projection of a signal into spherical harmonics. For a point in space, the gradient defines how the SH coefficients change if the center of projection moves on one of the principle axis (X, Y, or Z). Given a sphere (or some other light source shape) floating centered at any point in space, a gradient can be computed for some other fixed point (center of character for example) that models how the projection of the light source changes if you move on one of the principle axis.

As shown in FIG. 4, the character 405 is lit based on a center of the character 410 (also shown as 410' in rig 420) and a gradient in each of the three dimensions X, Y, and Z. In one embodiment, the gradient irradiance rig 410 provides a spatially varying rig based on the projection of the lighting environment at the center of the character ($l_c$) plus a linear model of how the lighting changes in each dimension. In particular, the first derivative of a light representation projected into spherical harmonics is computed in each of the X, Y, and Z dimensions, resulting in lighting gradients in each dimension (labeled in FIG. 4 as $g_x$, $g_y$, $g_z$). This results in a model 415 of: $l_i$=M(p, {$l_c$, $g_x$, $g_y$, $g_z$})=$lc+p_x g_x + p_y g_y + p_z g_z$. That is, the model coefficients for determining the irradiance at any point on the surface of the character are the sum of the SH coefficients at the center and the relative change in the x plane multiplied by the gradient in x, the relative change in the y plane multiplied by the gradient in y, and the relative change in the z plane multiplied by the gradient in z. Note, not all three gradients need be used. For example, in a mixed rig approach discussed below, a character may be lit using a gradient in one direction (e.g., the horizontal axis of a vehicle) and a constant in another direction (e.g., the vertical axis of the vehicle).

For a spherical light source, the gradients as $g_x$, $g_y$, $g_z$ can be efficiently evaluated using techniques know in the art. For more general light sources, like disks, the gradient can be computed numerically.

Figure 5:
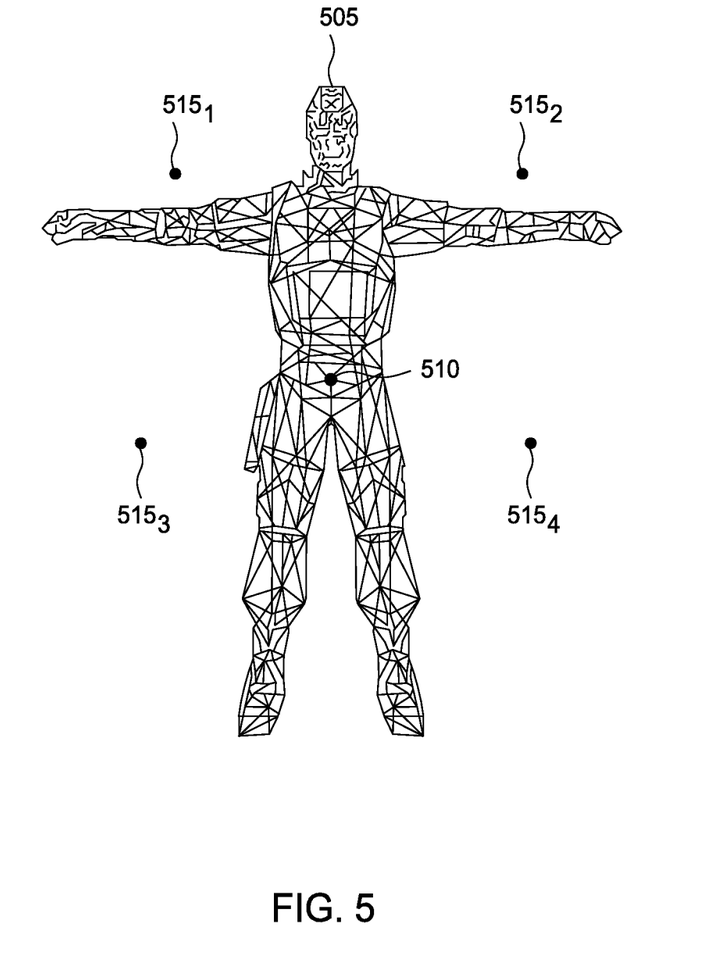
FIG. 5 is an example of a character lit using a lattice irradiance rig, according to one embodiment of the invention.

FIG. 5 is an example of a character 505 lit using a lattice irradiance rig, according to one embodiment of the invention. As shown, a lattice comprising four lattice points 515 ($c_j$) is used to determine irradiance variation between the center (c) and lattice points 515 for the surface of the character frame-by-frame. At each lattice point 515 ($c_j$) the analytic lights are sampled (i.e., light sources evaluated analytically), and then tri-linear interpolation may be used to reconstruct the irradiance at a given point on the surface of the character. Given a reconstruction function b(p), then the irradiance coefficients ($l_i$) may be computed as follows:

$$M(p', m) = \sum_i b_i(p')b$$

where each $c_j$ is the SH coefficients for the lattice point $c_j$. In one embodiment, this may be evaluated in hardware using a volumetric texture.

In addition to the constant, gradient, and lattice irradiance rigs discussed above, other lighting rigs may be used. For example, other basic rigs may be constructed using radial basis functions and a linear polynomial; using functions and gradients in a lattice; or using hermite interpolation. However, in practice, these approaches may perform poorly from a quality per unit performance standpoint relative to the constant, gradient, and lattice irradiance rigs.

Figure 6:
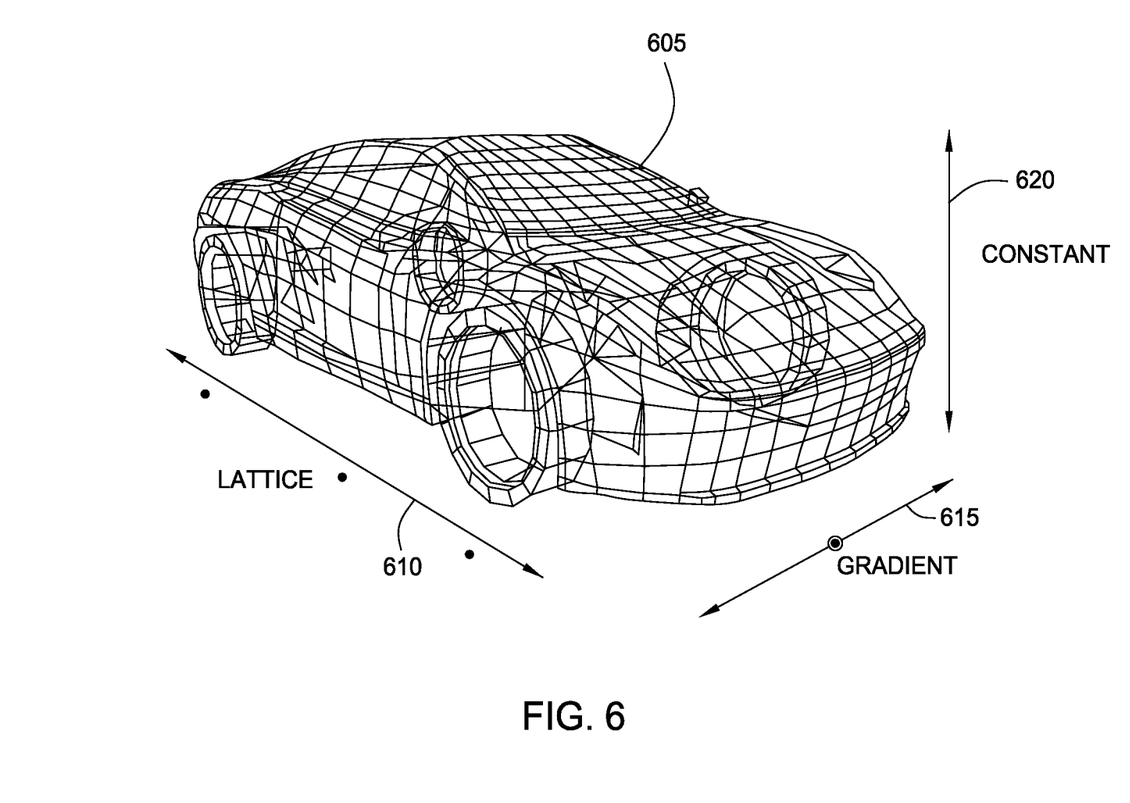
FIG. 6 is an example of a model lit using a mixed irradiance rig, according to one embodiment of the invention.

Additionally, as mentioned above, in some cases a mixed rig approach may be used. For non-spherical objects, it may be advantageous to employ different irradiance rig models for different dimensions. For example, FIG. 6 shows an example of a character with significant variation in each dimension. In particular, the character in FIG. 6 provides a model of a vehicle 605. To light the vehicle 605, a rig that is a 3 sample lattice 610 is used for the largest dimension, a gradient rig 615 is used in the second largest dimension, and a constant rig 620 is used in the smallest dimension. The mixed rig approach performs well for characters that exhibit a relatively constant shape with large variation across different dimensions—such as vehicle 605. For example, lighting the vehicle 605 using the three rigs set forth above requires only 6 sets of SH coefficients to be evaluated each frame.

Further, in one embodiment, a least squares approach may be used to generate model coefficients. That is, the irradiance rigs discussed above are defined in terms of the spatial extent of the character and do not depend on the actual geometry at all. However, given a known object, such as the vehicle 605 shown in FIG. 6, the model coefficients can be solved for at a discrete set of points on the surface of the object using least squares. For example, Lloyd's algorithm may be used to distribute j samples $s_j$ near the surface of the object. Mathematically this process minimizes the following equation:

$$E(c) = \sum_j (M(s_j, c) - I_j)^2$$

Where $l_j$ are the SH lighting coefficients at sample location $s_j$. If the rig function M is linear in p, then a matrix (A) can be built where the entries $a_{ij}$ in the matrix (A) correspond to the influence of the $j_{th}$ model parameter at the $i_{th}$ sample location. Each SH coefficient of the model parameters is independent and results in the following set of equations:

$$Ac=1 => c=(A^tA)^{-1}A^tl=Ll$$

This is a linear least squares problem which can be solved once, generating a matrix L which provides the model parameters in matrix c when multiplied by the SH coefficients at all the sample locations. The matrix c is the SH coefficients of each model parameter laid out as rows, same for the SH coefficients on the right hand side of I. For example, for a gradient rig in three dimensions, the formulation is as follows:

$$\begin{bmatrix} 1 & s_{1x} & s_{1y} & s_{1z} \\ 1 & s_{2x} & s_{2y} & s_{2z} \\ \ldots & & & \\ 1 & s_{nx} & s_{ny} & s_{nz} \end{bmatrix} \begin{bmatrix} l_c^t \\ g_x^t \\ g_y^t \\ g_z^t \end{bmatrix} = \begin{bmatrix} l_1^t \\ l_2^t \\ \ldots \\ l_n^t \end{bmatrix}$$

Note, the matrix L does not depend on the number of bands used to represent irradiance, it just depends on the number of model parameters and sample points. Accordingly, given N sample points, for a constant function L is a 1×N matrix1, 4×N for a gradient, and S×N for a 3D lattice with s samples per side. It is also possible to incorporate the variation in surface normal associated with a given model parameter. However, doing so makes the linear system depend on all the SH coefficients, so the L matrix would have to be much larger.

Figure 7:
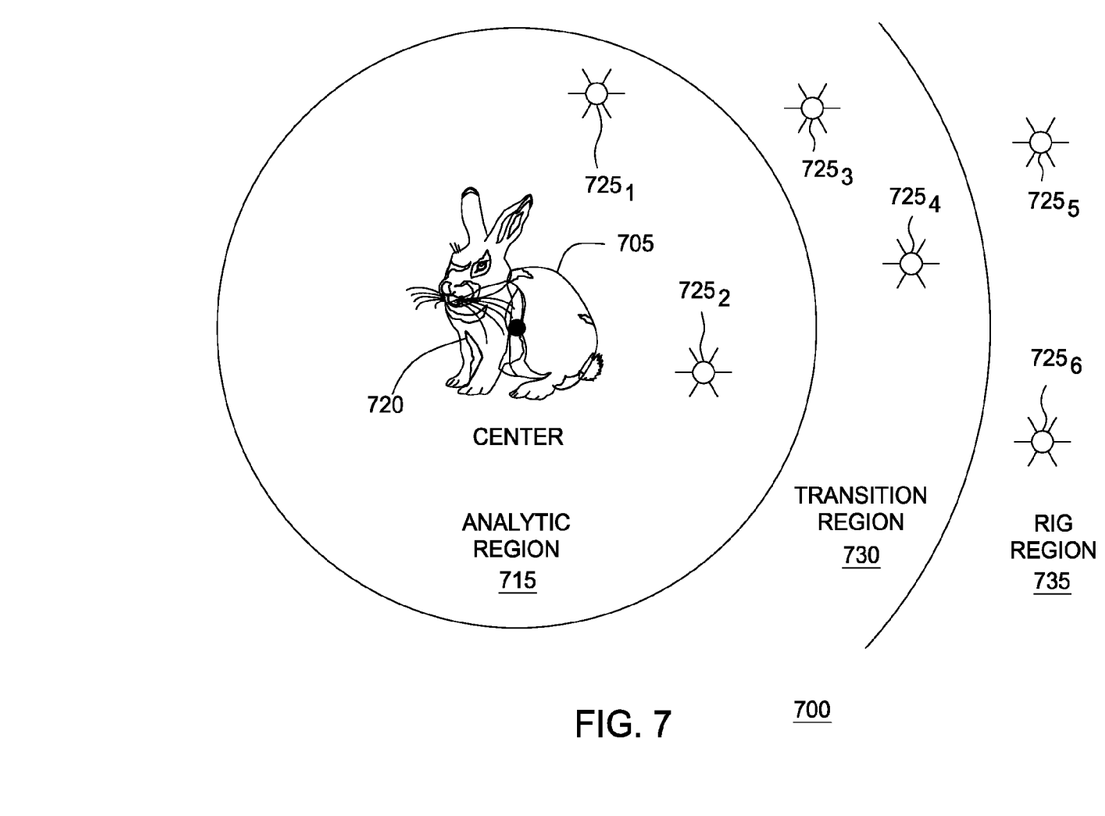
FIG. 7 illustrates an example of multiple lighting sources used to light a character, according to one embodiment of the invention.

FIG. 7 illustrates an example of a lighting environment 700 which includes multiple light sources $725_{1-6}$ used to light a character 705, according to one embodiment of the invention. As shown, the character 705 (a bunny) is lit using lights from three different regions, an analytic region 715 includes two light sources $715_{1-2}$ near the character 705. These two light sources are evaluated analytically. The two lights farthest from the center 720 of character 705 are lights $725_{5-6}$ in a rig region 735. These two lights may be evaluated using a constant rig. That is, the irradiance at any point on the surface of the character 705 is determined using the spherical harmonics corresponding to the center 720—regardless of the surface point in question.

In between the analytic region 715 and the rig region 735 is a transition region 730, which includes light sources $725_{3-4}$. In one embodiment, lights in the transition region 730 are evaluated both analytically and in the rig, and the resulting values are blended to determine lo light the character 705. For example, light source $725_3$ is closer to the analytic region 715. Thus, the contribution computed by evaluating light source $725_3$ analytically would be greater than the contribution from the approximation determined by evaluating this light source in the rig. The actual calculation may be determined as a weighted blending, e.g., if a percentage of X is used to determine a contribution from a light source evaluated analytically, then a percentage of (1−X) may be used to weight the contribution of the light source when evaluated in the rig. Changing the weighting percentage X gradually based on the distance from the character 205 helps to eliminate artifacts and maintain high performance.

Figures 8A, 8B:
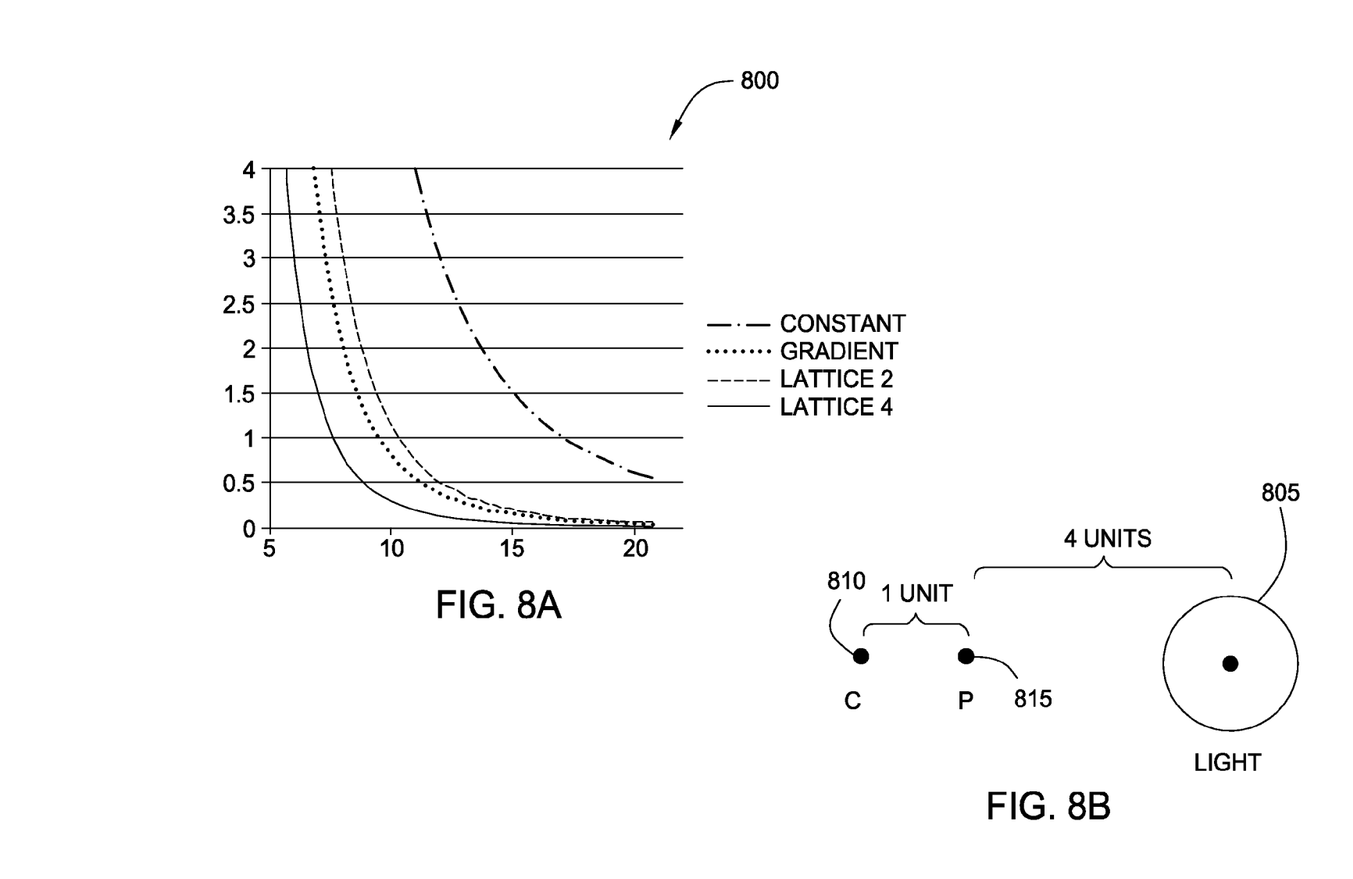
FIGS. 8A-8B illustrate an example of a set of error curves used to determine whether to evaluate a lighting source analytically or in an irradiance rig, according to one embodiment of the invention.

Further, in one embodiment, the distance from the character to the boundary between the analytic region 715 and the transition region and the distance from the character to the boundary between the transition region and the rig may be specified using an error metric, such as a collection of error curves generated for the character. The error curves model how much error results from lighting a character in a given rig versus analytically on an 8-bit display (i.e., a grayscale of lighting intensity from 0-255) as a function of a normalized distance to the character. For example, FIG. 8B illustrates an example of a set of error curves 800 used to determine whether to evaluate a lighting source analytically or in an irradiance rig, according to one embodiment of the invention. As shown, the error curves 800 are computed for a constant rig, a gradient lattice, a two-point lattice, and a four point lattice. The distance from a light source is plotted along the x axis 805 and the resulting error is plotted along the y axis 810.

In one embodiment, the error curves 800 may be generated in a normalized way to account for both the brightness of the light and the size of the character. For example, FIG. 8A shows a light source a light source 805 placed four units away from a point P 815, and P is placed a distance of 1 unit from itself to the center C 810 of a character. In this case, the point P 815 is defined to be the point in a character (e.g., the person modeled in FIGS. 3-5 or the vehicle shown FIG. 6) furthest from the geometric center C 810 of that character—this distance is used to define 1 unit. Once light source 805 is set four units away from point P 815, an intensity of the light source 805 is selected that results in a radiance of 1.0 at point P 815. Using this configuration, the light source 805 (or the character) is translated to increase and decrease the distance between itself and the character (or the light source). And at each position, the lighting is evaluated analyticity and using multiple rigs. Taking the analytical computation as being correct, a percentage of error may be determined between the analytical computation and the evaluations in the rig.

Computing the error curves 800 in this way allows them to be normalized so they are consistent for different radii. Further, the error curves 800 are identical independent of radii, so only a single curve needs to be computed per irradiance rig. In one embodiment, the error measured is the absolute difference*255, so when a given error curve intersects 1 there is one gray level of error in an 8 bit display.

For example, given a light intensity scale factor f, a user-specified error bound e and a light intensity i, the error curve 800 may be searched by using the ratio of (ef/i) in y-axis to get a reasonable distance in x-axis at which to transition (or begin transitioning) from analytically evaluating the light source to using the rig.

Figure 9:
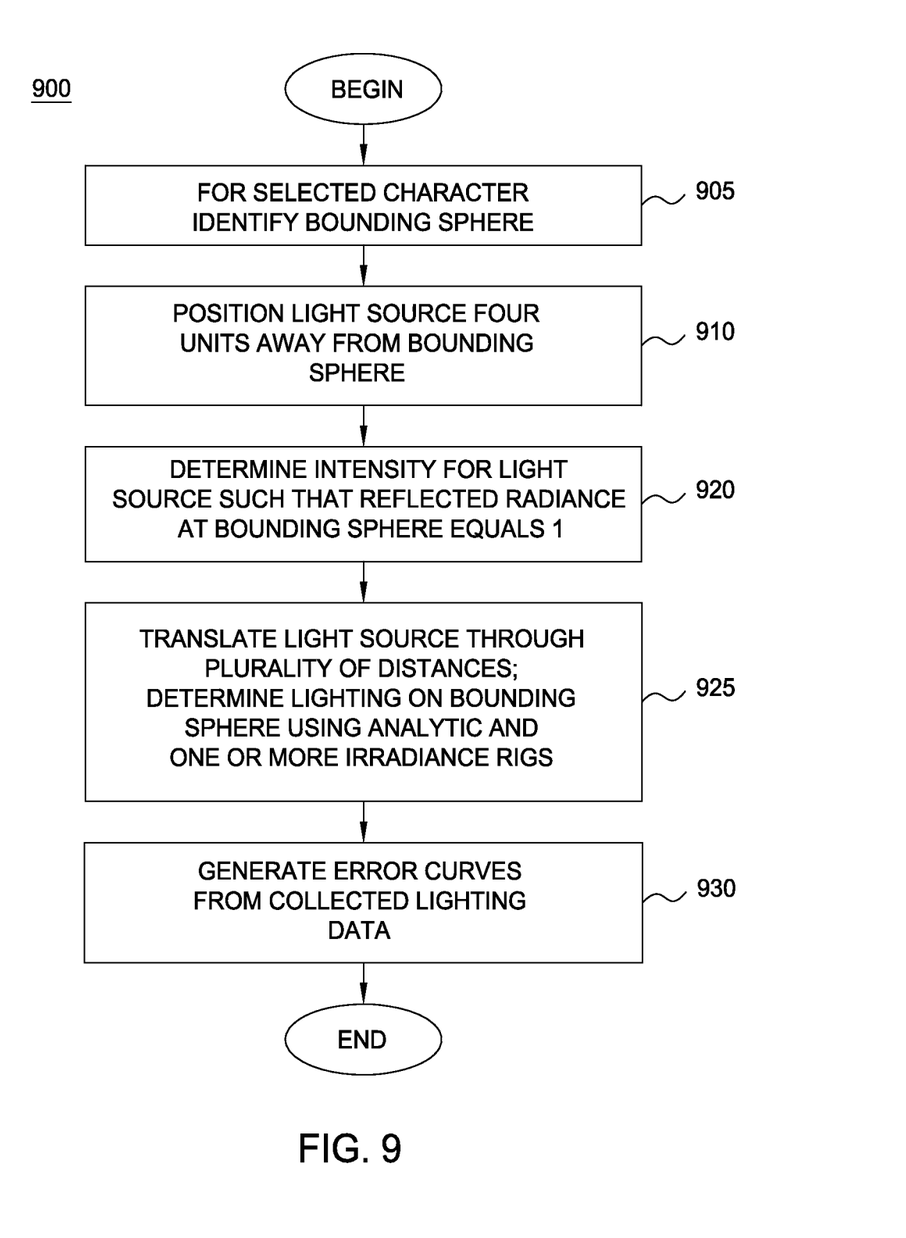
FIG. 9 illustrates a method for computing a set of error curves used to determine whether to evaluate a lighting source analytically or in an irradiance rig, according to one embodiment of the invention.

FIG. 9 illustrates an embodiment of a method 900 for computing the error curves used to determine whether to evaluate a lighting source analytically or in an irradiance rig. As shown, the method 900 begins at step 900, where a bounding sphere is identified for a given character. That is, a unit distance of one from the point C 810 to the point P 815 is identified. At step 910, a light source is positioned four units away from the point C. And at step 915, an intensity is determined for the light source such that the reflected radiance at the bounding sphere (i.e., at point C) is equal to 1.0.

At step 925, the distance between the character and the light source is varied, and the resulting irradiance is evaluated both analytically and in any number of desired irradiance rigs. The absolute difference between the light evaluated analytically and the rig provides a measure of error at a given distance. Once the lighting data is obtained for the model, error curves may be generated where the error in pixel values (based on a 255 display) are modeled as a function of distance from the light source. Further, once computed, a light source in a model may be scaled for intensity and the curve for a given rig searched using (ef/i) to find the distance where a given error value occurs. For example, a user may specify to transition from an analytical evaluation to using a rig when the error exceeds two pixel color values. The corresponding distance for transitioning is then is readily determined from the error curves using the approaches discussed above. Of course, if the intensity of a light source changes, then the error curve needs to be re-searched to update the transition distance.

Figure 10:
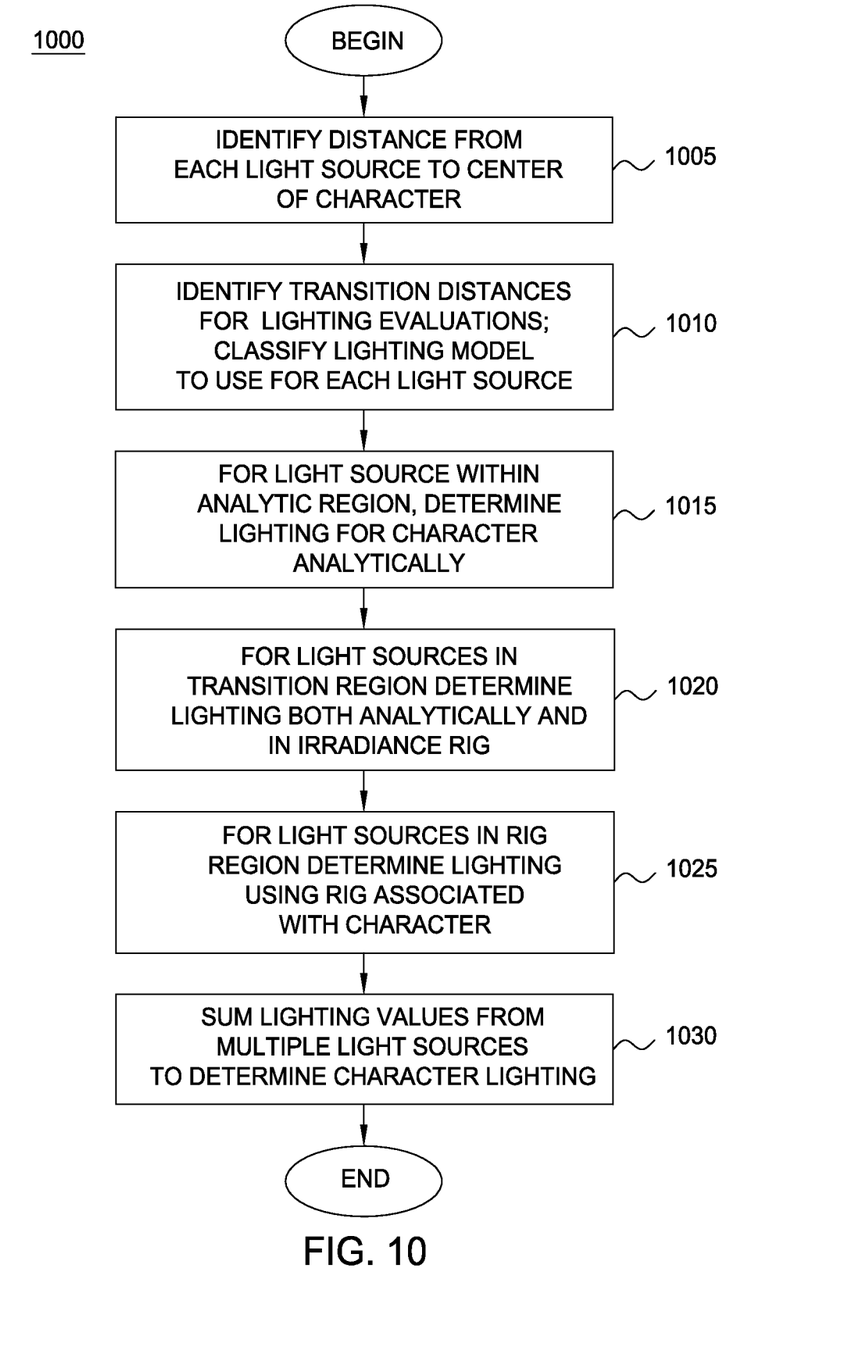
FIG. 10 illustrates a method for computing lighting levels for characters in an environment which uses precomputed lighting for 3D scene geometry, according to one embodiment of the invention.

FIG. 10 illustrates a method 1000 for computing lighting levels for characters in an environment which uses precomputed lighting for 3D scene geometry, according to one embodiment of the invention. As shown, the method 1000 begins at step 1005, where the distance from each light source to the center of the character is identified. Thereafter, the light sources are classified based on the transition distances set by a lighting artist and the error curves generated for lighting a given character. For example, at step 1010, the each light source is classified based on the transition distances generated by searching the error curve for a given error bound using the (e*f)/i equation from above to classify each light source to be evaluated using one of an analytical approach, a transition approach, or a using an irradiance rig.

At step 1015, for light sources within the analytic region, the irradiance of the surface of the character is evaluated analytically. At step 1020, for light sources in the transition region, the irradiance of the surface of the character is evaluated both analyticity and using the rig. The results may be blended together using, e.g., the weighted blending approach described above. At step 1025, for light sources in the rig region, the irradiance of the surface of the character is evaluated in the rig. Once the light source for all the regions are evaluated, the character may be lit by determining the sum of the irradiance for a given a point of the character from the cumulative evaluations of the light sources. The method 1000 may be repeated for multiple points of geometry on the character to determine the lighting for a character frame-by-frame.

In sum, embodiments of the invention provide techniques for lighting objects in computer generated images, e.g., for lighting characters in a video game from frame-to-frame. As described, a character may be associated with an irradiance rig—a lighting model used to approximate character lighting—based on the lighting in the scene. Examples of irradiance rigs include a constant rig, a gradient rig, a lattice rig, and a mixed rig. A local lighting representation may be used to explicitly model spatial variation of a character and error driven criteria may be used to determine whether to evaluate a given light source analytically or in a lighting rig. For near light sources, the error driven criteria may be used to determine when a spherical light source should be evaluated in the lighting rig verses analytically. For example, an error curve may be computed to model how much error results from lighting a character in a given rig, based on a distance from the character and an intensity of the light source. For large characters, local irradiance models may be used to provide a limited form of spatial variation.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for computing lighting irradiance for an object in a three-dimensional (3D) graphics scene having one or more light sources, the method comprising:
    for a plurality of frames depicting the object in the 3D graphics scene being lit by the light sources:
        determining, by operation of one or more computer processors, based on an error metric, whether to evaluate one or more of the light sources analytically or to approximate the light source using an irradiance rig associated with the object, wherein the irradiance rig provides a lighting model used to approximate object lighting, based on the light sources, wherein the error metric characterizes an error resulting from evaluating a respective one of the light sources using the irradiance rig associated with the object, wherein the determination is based on a distance between the object and the respective light source, a size of the object, and an intensity of the respective light source, and wherein respective light sources are determined to be evaluated using the irradiance rig when the error is below a specified threshold.

2. The computer-implemented method of claim 1, wherein the error metric for the one or more light sources is an error curve modeling how much error results from lighting the object using the irradiance rig associated with the object based on a lighting intensity of the light source and a distance between the object and the light source in the 3D graphics scene.

3. The computer-implemented method of claim 1, further comprising, classifying, based on the error metric, one or more of the light sources as being evaluated both analytically and in the irradiance rig associated with the object, and wherein the lighting irradiance for light sources evaluated both analytically and in the irradiance rig associated with the object is determined as a blended average of an analytical lighting evaluation and an irradiance rig evaluation.

4. The computer-implemented method of claim 1, wherein the irradiance rig is a constant irradiance rig determined using a constant spherical harmonic (SH) function computed relative to the center of the object.

5. The computer-implemented method of claim 1, wherein the irradiance rig is a gradient irradiance rig determined using a constant spherical harmonic (SH) function computed relative to the center of the object and a linear model providing a lighting gradient in one or more spatial dimensions of the object.

6. The computer-implemented method of claim 5, wherein the linear model comprises a first derivative of a projection of the lighting into spherical harmonics (SH) centered at the object in each of the one or more spatial dimensions.

7. The computer-implemented method of claim 1, wherein the irradiance rig is a lattice irradiance rig composed from two or more lattice points, wherein the lighting at each lattice point is computed as a spherical harmonic (SH) function computed relative to a position of the lattice point and the center of the object.

8. The computer-implemented method of claim 1, wherein the irradiance rig comprises a combination of at least two of a constant rig, a gradient rig, and a lattice rig, each in a different spatial dimension of the object.

9. A non-transitory computer-readable storage medium storing instructions that, when executed by a processor, cause a computer system to perform an operation for computing lighting irradiance for an object in a three-dimensional (3D) graphics scene having one or more light sources, the operation comprising:

for a plurality of frames depicting the object in the 3D graphics scene being lit by the light sources:
determining, by operation of one or more computer processors, based on an error metric, whether to evaluate one or more of the light sources analytically or to approximate the light source using an irradiance rig associated with the object, wherein the irradiance rig provides a lighting model used to approximate object lighting, based on the light sources, wherein the error metric characterizes an error resulting from evaluating a respective one of the light sources using the irradiance rig associated with the object, wherein the determination is based on a distance between the object and the respective light source, a size of the object, and an intensity of the respective light source, and wherein respective light sources are determined to be evaluated using the irradiance rig when the error is below a specified threshold.

10. The computer-readable storage medium of claim 9, wherein the error metric for the one or more light sources is an error curve modeling how much error results from lighting the object using the irradiance rig associated with the object based on a lighting intensity of the light source and a distance between the object and the light source in the 3D graphics scene.

11. The computer-readable storage medium of claim 9, wherein the operation further comprises, classifying, based on the error metric, one or more of the light sources as being evaluated both analytically and in the irradiance rig associated with the object, and wherein the lighting irradiance for light sources evaluated both analytically and in the irradiance rig associated with the object is determined as a blended average of an analytical lighting evaluation and an irradiance rig evaluation.

12. The computer-readable storage medium of claim 9, wherein the irradiance rig is a constant irradiance rig determined using a constant spherical harmonic (SH) function computed relative to the center of the object.

13. The computer-readable storage medium of claim 9, wherein the irradiance rig is a gradient irradiance rig determined using a constant spherical harmonic (SH) function computed relative to the center of the object and a linear model providing a lighting gradient in one or more spatial dimensions of the object.

14. The computer-readable storage medium of claim 13, wherein the linear model comprises a first derivative of a projection of the lighting into spherical harmonics (SH) centered at the object in each of the one or more spatial dimensions.

15. The computer-readable storage medium of claim 9, wherein the irradiance rig is a lattice irradiance rig composed from two or more lattice points, wherein the lighting at each lattice point is computed as a spherical harmonic (SH) function computed relative to a position of the lattice point and the center of the object.

16. The computer-readable storage medium of claim 9, wherein the irradiance rig comprises a combination of at least two of a constant rig, a gradient rig, and a lattice rig, each in a different spatial dimension of the object.

17. A system, comprising:
a processor; and
a memory configured to perform an operation for computing lighting irradiance for an object in a three-dimensional (3D) graphics scene having one or more light sources, the operation comprising:
for a plurality of frames depicting the object in the 3D graphics scene being lit by the light sources:
determining, by operation of one or more computer processors, based on an error metric, whether to evaluate one or more of the light sources analytically or to approximate the light source using an irradiance rig associated with the object, wherein the irradiance rig provides a lighting model used to approximate object lighting, based on the light sources, wherein the error metric characterizes an error resulting from evaluating a respective one of the light sources using the irradiance rig associated with the object, wherein the evaluation is based on a distance between the object and the respective light source, a size of the object, and an intensity of the respective light source, and wherein respective light sources are determined to be evaluated using the irradiance rig when the error is below a specified threshold.

18. The system of claim 17, wherein the error metric for the one or more light sources is an error curve modeling how much error results from lighting the object using the irradiance rig associated with the object based on a lighting intensity of the light source and a distance between the object and the light source in the 3D graphics scene.

19. The system of claim 17, wherein the operation further comprises, classifying, based on the error metric, one or more of the light sources as being evaluated both analytically and in the irradiance rig associated with the object, and wherein the lighting irradiance for light sources evaluated both analytically and in the irradiance rig associated with the object is determined as a blended average of an analytical lighting evaluation and an irradiance rig evaluation.

20. The system of claim 17, wherein the irradiance rig is a constant irradiance rig determined using a constant spherical harmonic (SH) function computed relative to the center of the object.

21. The system of claim 17, wherein the irradiance rig is a gradient irradiance rig determined using a constant spherical harmonic (SH) function computed relative to the center of the object and a linear model providing a lighting gradient in one or more spatial dimensions of the object.

22. The system of claim 21, wherein the linear model comprises a first derivative of a projection of the lighting into spherical harmonics (SH) centered at the object in each of the one or more spatial dimensions.

23. The system of claim 17, wherein the irradiance rig is a lattice irradiance rig composed from two or more lattice points, wherein the lighting at each lattice point is computed as a spherical harmonic (SH) function computed relative to a position of the lattice point and the center of the object.

24. The system of claim 17, wherein the irradiance rig comprises a combination of at least two of a constant rig, a gradient rig, and a lattice rig, each in a different spatial dimension of the object.

\* \* \* \* \*

UNITED STATES PATENT AND TRADEMARK OFFICE
CERTIFICATE OF CORRECTION

| | | |
|---|---|---|
| PATENT NO. | : 8,704,831 B2 | Page 1 of 1 |
| APPLICATION NO. | : 12/756688 | |
| DATED | : April 22, 2014 | |
| INVENTOR(S) | : Sloan et al. | |

It is certified that error appears in the above-identified patent and that said Letters Patent is hereby corrected as shown below:

In the Specification

Column 9, Line 35, please delete "lo" and insert --how to-- therefor;

Column 9, Line 46, please delete "205" and insert --705-- therefor.

Signed and Sealed this
Twenty-ninth Day of July, 2014

Michelle K. Lee
*Deputy Director of the United States Patent and Trademark Office*